(12) United States Patent
Buckus et al.

(10) Patent No.: US 10,035,230 B2
(45) Date of Patent: Jul. 31, 2018

(54) ACTIVE FIXTURING DEVICE AND SYSTEM

(71) Applicant: The Boeing Company, Chicago, IL (US)

(72) Inventors: Gary M. Buckus, Snohomish, WA (US); Paul J. Hixson, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 426 days.

(21) Appl. No.: 14/790,877

(22) Filed: Jul. 2, 2015

(65) Prior Publication Data
US 2017/0001276 A1    Jan. 5, 2017

(51) Int. Cl.
*B23Q 7/04*    (2006.01)
*B23Q 3/08*    (2006.01)
*G05B 19/19*   (2006.01)
*G05B 19/418*  (2006.01)

(52) U.S. Cl.
CPC .............. *B23Q 7/04* (2013.01); *B23Q 3/088* (2013.01); *G05B 19/19* (2013.01); *G05B 19/4182* (2013.01); *G05B 2219/45174* (2013.01); *G05B 2219/50127* (2013.01); *G05B 2219/50358* (2013.01); *Y02P 90/083* (2015.11)

(58) Field of Classification Search
CPC . B25B 11/00; B25B 11/005; Y10T 29/49998; Y10T 29/5138; Y10T 29/5143; Y10T 29/53539; Y10T 29/53543; Y10T 29/53548; Y10T 29/53961; Y10T 29/53974; Y10T 29/53978; Y10T 29/53991; B23Q 3/062; B23Q 3/065; B23Q 3/088

USPC ...................... 269/55, 21; 409/219–220, 225
See application file for complete search history.

(56) References Cited

U.S. PATENT DOCUMENTS

| 4,491,306 A | * | 1/1985 | Eickhorst | ............. | B25B 11/005 269/21 |
| 4,527,783 A | * | 7/1985 | Collora | ................. | B23Q 1/032 269/21 |
| 7,444,742 B2 | * | 11/2008 | Sturm, Jr. | ............. | B23Q 1/035 269/289 R |
| 7,584,947 B2 | * | 9/2009 | Freeland | ............... | B23Q 1/035 269/21 |

(Continued)

*Primary Examiner* — Jason L Vaughan
*Assistant Examiner* — Amanda Meneghini
(74) *Attorney, Agent, or Firm* — Miller, Matthias & Hull LLP (57) ABSTRACT

A system for machining semi-rigid curved panels includes a fixturing device within an enclosure cell, the cell having a sealable entrance and a sealable exit. A holding table, moveable through the sealable entrance between the inside and outside of the cell, is configured to receive unfinished semi-rigid curved panels. Another holding table, fixed outside of the cell, is configured to receive processed semi-rigid curved panels. A first robot inside the cell transports the semi-rigid curved panels from the first holding table and onto the fixturing device, later transporting the curved panels from the fixturing device onto the second holding table through the sealable exit. A second robot processes the semi-rigid curved panels on the fixturing device. A controller is configured to sequentially actuate first and second robots for transporting and processing the semi-rigid curved panels, and to manage a vacuum clamping system for workpiece retention on the fixturing device.

11 Claims, 5 Drawing Sheets

(56) References Cited

U.S. PATENT DOCUMENTS

| | | | | |
|---|---|---|---|---|
| 7,866,642 B2* | 1/2011 | McAllister | ............. | B23Q 1/035 269/266 |
| 8,774,971 B2* | 7/2014 | Marsh | ....................... | B64F 5/60 700/275 |
| 2009/0057971 A1* | 3/2009 | Bumgarner | ............ | B23Q 1/035 269/21 |
| 2009/0309283 A1* | 12/2009 | Blick | .................... | B23Q 1/032 269/259 |

* cited by examiner

ACTIVE FIXTURING DEVICE AND SYSTEM

FIELD

The present disclosure relates generally to robotic machining of semi-rigid curved panel workpieces, and more specifically to a fixturing system for managing such machining.

BACKGROUND

Machining die-formed semi-rigid curved panels often requires special handling considerations not required of rigid structures. In particular, there are safety considerations related to the transporting and handling of such structures which may be floppy and unwieldy, making them more difficult and awkward to work with. Fixturing systems that involve, for example, finishing of edges of such panels may involve unique procedures for physically holding the panels in place for such finishing.

As a result, fixturing work involving such parts can be more labor intensive, and hence less compatible with assembly line protocols, than similar fixturing work with structurally rigid and/or less semi-rigid parts. Recent moves to greater robotic fixturing of workpieces have driven a need for new approaches in handling semi-rigid structures. More work is needed to improve safety and reduce ergonomic burdens associated with robotic manipulation of such unwieldy panels, and/or to find new ways for automating work with semi-rigid structures.

It is therefore desirable to develop improved automated fixturing systems that may be less sensitive to issues associated with lack of rigidity of workpieces needing to be machine finished.

SUMMARY

In accordance with one aspect of the present disclosure, a fixturing device for processing a semi-rigid curved panel includes a base extending longitudinally along an axis, and a plurality of contoured support members laterally secured to the base. At least one or a section of the contoured support members is axially movable on the base, and configured to be selectively fixed to the base in one of a plurality of positions.

In accordance with another aspect of the present disclosure, the plurality of contoured support members includes a first end contoured support member and a second end contoured support member defining longitudinal extremities of the fixturing device.

In accordance with another aspect of the present disclosure, a first pneumatically controlled suction device is orthogonally retractable with respect to the axis; and a second pneumatically controlled suction device is rotatably moveable relative to the contoured support members.

In accordance with yet another aspect of the present disclosure, a first proximity sensor is attached to at least one of the contoured support members for sensing whether the at least one contoured support member is fixed to one of a plurality of axial positions on the base; and a second proximity sensor is secured to one of the contoured support members for determining whether the curved panel is in contact with that one contoured support member.

In accordance with yet another aspect of the present disclosure, the active fixturing device includes a base for supporting the contoured support members, and the contoured support members are cradles configured to support the semi-rigid curved panel.

In accordance with yet another aspect of the present disclosure, a system for transporting and machine processing a semi-rigid curved panel includes an enclosure cell including a sealable entrance and a first sealable exit, the cell containing a fixturing device, and a first holding table positioned outside, and adjacent the first sealable entrance, of the enclosure cell, the table configured to receive and support an unprocessed semi-rigid curved panel.

In accordance with a still further aspect of the present disclosure, the first holding table is moved from outside to inside of the enclosure cell, through the first sealable entrance of the enclosure cell, and the second holding table is configured to receive and support a processed semi-rigid curved panel through a first sealable exit.

In accordance with a still further aspect of the present disclosure, the system includes a first robot fixed inside the enclosure cell for transporting the semi-rigid curved panel from the first holding table when inside the enclosure cell and onto the fixturing device, and for transporting the semi-rigid curved panel from the fixturing device to the second holding table through the first sealable exit.

In accordance with yet a still further aspect of the present disclosure, the system includes a second robot fixed inside the enclosure cell for processing the semi-rigid curved panel on the fixturing device, and a controller configured to sequentially move the first and second robots to transport and process the semi-rigid curved panel, and to evacuate processing debris from the enclosure cell through a second sealable exit.

The features, functions, and advantages disclosed herein can be achieved independently in various embodiments or may be combined in yet other embodiments, the details of which may be better appreciated with reference to the following description and drawings.

It should be understood that the drawings are not to scale, and that the disclosed embodiments are illustrated only schematically. It should be further appreciated that the following detailed description is only exemplary, and not intended to be limiting. As such, although the present disclosure is, for purposes of explanatory convenience, depicted and described in only illustrative embodiments, the disclosure may be implemented in numerous additional embodiments, and within or as part of various additional systems and environments not shown or described herein.

DETAILED DESCRIPTION

The following detailed description is intended to provide examples of both apparatus and methods for carrying out the disclosure. Actual scope of the disclosure is as defined by the appended claims.

Figure 1:
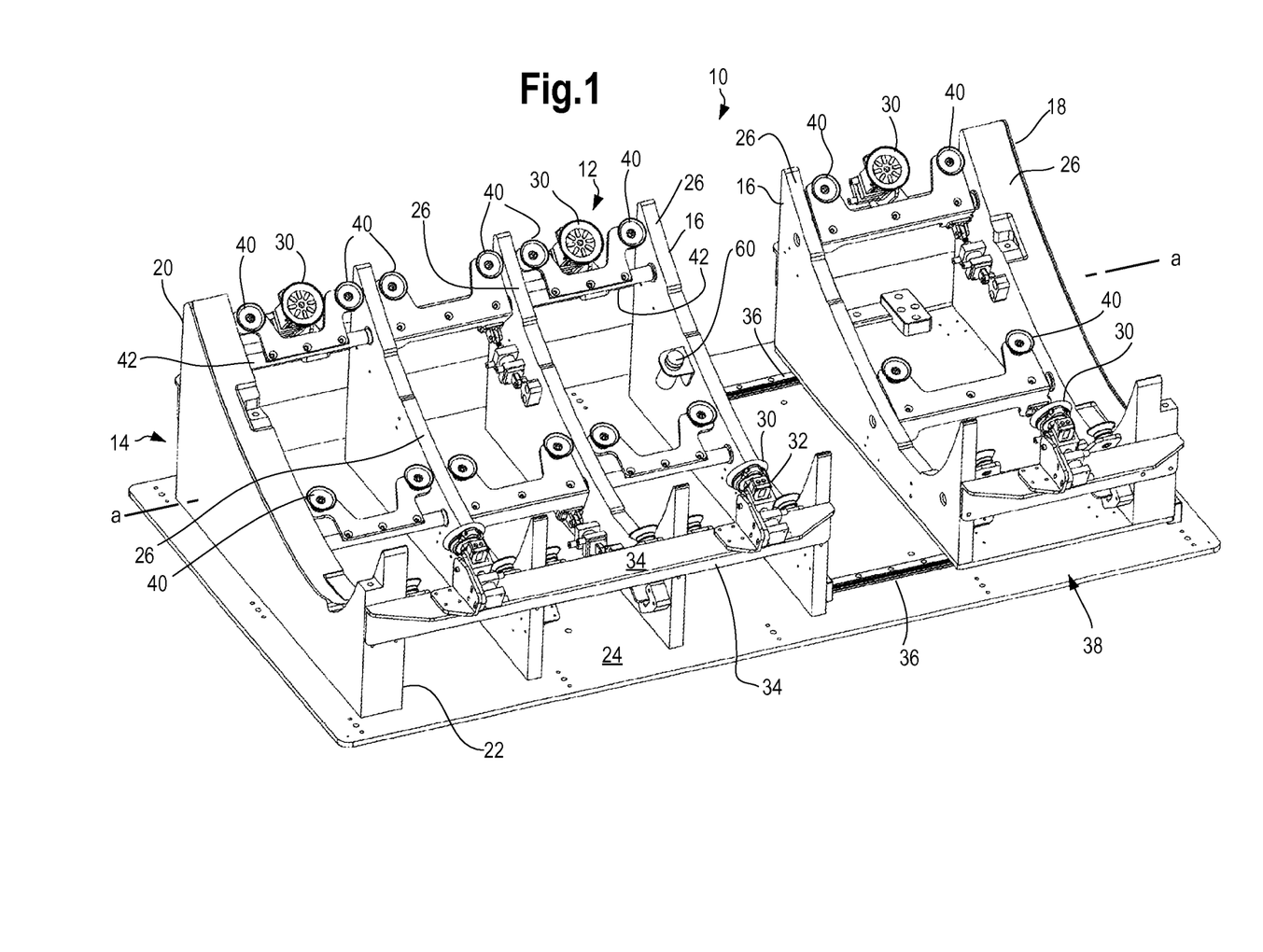
FIG. 1 is a perspective schematic view of a fixturing device that may be used for machine finishing of semi-rigid panels in accordance with the present disclosure.

Referring initially to FIG. 1, an active fixturing device 10 incorporates a vacuum clamping system 12 as further described herein. The fixturing device 10 includes a supporting base 22 that extends longitudinally along an axis "a-a", as shown. Laterally extending support members, configured as contoured cradles 16, are situated perpendicularly to the axis a-a. In the disclosed embodiment, the cradles 16 are oriented in parallel, are uniformly spaced along the axis a-a, and are collectively configured to support a semi-rigid curved workpiece such as a lightweight honeycomb panel used in an aircraft interior, which may constitute an overhead bin cover, for example.

The fixturing device 10 includes a first end support member 18, and a second end support member 20, which, along with the intermediately situated lateral support members 16, are also concave-shaped cradles configured for supporting the semi-rigid curved workpiece. However, the end support members 18, 20 form longitudinally spaced extremities of the fixturing device 10.

Continuing reference to FIG. 1, the fixturing device 10 includes the supporting base 22 which may include a floating quick-change platform 24, as shown. The supporting base 22 along with the lateral support members 16 collectively define a chassis 14 of the fixturing device 10. The fixturing device 10 further incorporates a first set of pneumatic suction devices, herein called suction cups 30, configured to be orthogonally retractable with respect to axis a-a for the purpose of holding a semi-rigid curved workpiece, such as a described panel, in place during a machining and/or other processing step.

Figure 2:
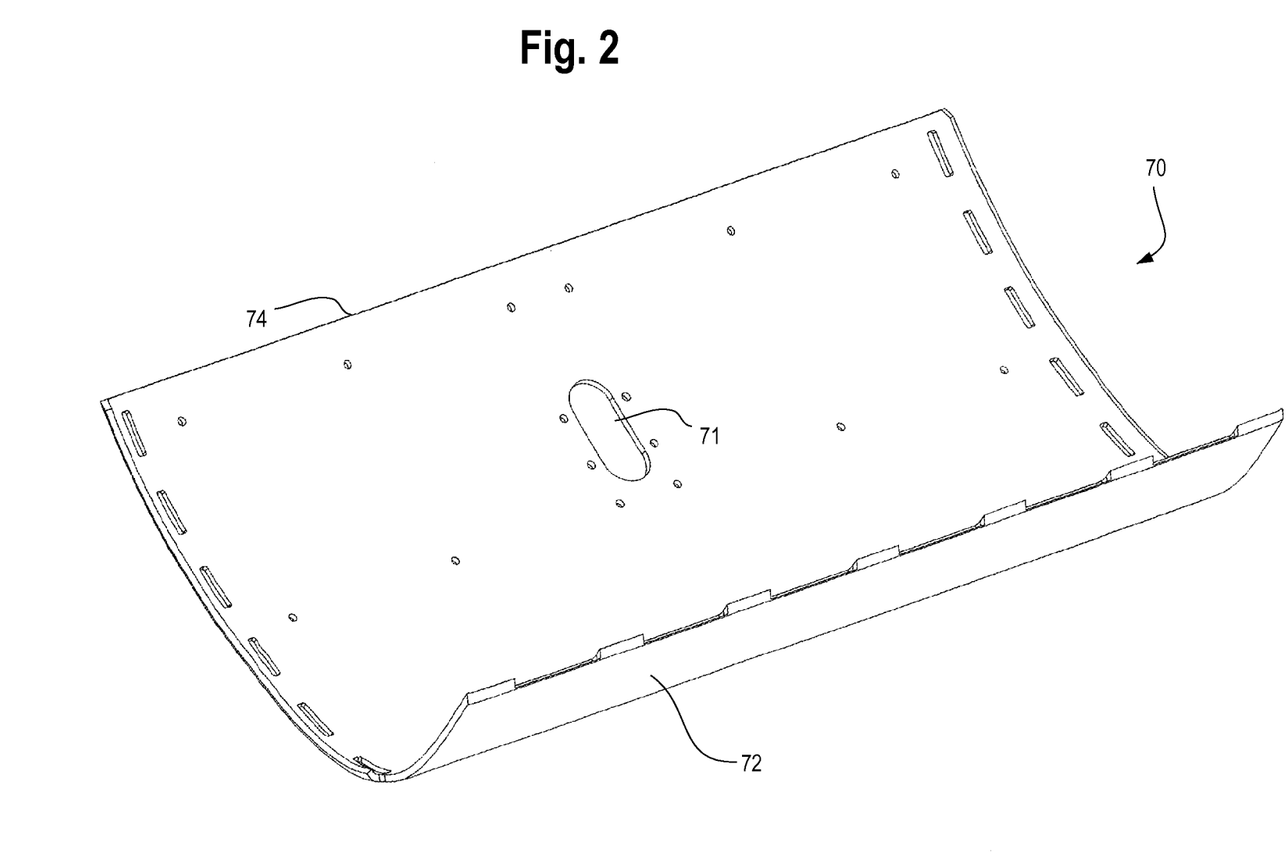
FIG. 2 is a perspective view of a semi-rigid panel that may be processed in accordance with the present disclosure.

Referring now to FIG. 2, a perspective view of an elongated semi-rigid clam-shell type panel 70 depicts a curved panel body 72 with edges 74 that may be supported by the fixturing device 10 for machining of edges 74, for example. The semi-rigid panel 70 may be initially formed as a die-cut honeycomb composite layered material of a Delrin (registered trademark of DuPont) resin or type of a thermoset resin composite, by way of examples only. As contemplated in this disclosure, the fixturing device is configured to trim the edges 74 of the semi-rigid panel 70, as well as to add slots 71 for handles and hinges, for example.

Referring back to FIG. 1, the pneumatic suction cups 30 (FIG. 1) are orthogonally retractable, as noted, for machining. For this purpose, the suction cups 30 are supported on linear actuators 32, which in turn are mounted on longitudinally extending supports 34, as shown.

Those skilled in the art may appreciate that the suction cups 30 may be linearly extended orthogonally upwardly on the actuators 32 above upper cradle surfaces 26, and/or to be lowered and pneumatically actuated to facilitate routing of the semi-rigid panel 70 on the fixture 10 during machining. Concurrently, a second set of pneumatic suction devices 40, herein also called suction cups 40, may be rotated into place, and actuated to provide an initial "pull down" of the curved panel curved panel body 72 against the upper surfaces 26 of the laterally extending cradles 16, 18, 20, described above. The second set of pneumatic suction cups 40, shown herein as slightly smaller for distinction purposes only, and are affixed to rotating shafts 42, which allow the suction cups 40 to move into position adjacent the upper cradle surfaces 26. The rotating shafts 42 allow at least some of the suction cups to be physically rotated out of the way during any actual machining phase, if or as desired, for added flexibility.

At least some of the end cradles, including end cradle 18 in the described example, may be moveable along rails 36, as shown. In the described embodiment, cradles 18 and its next-adjacent rail 16 as shown define a separate movable section of cradles 38 that may be moved to and fixed among several positions to accommodate several different curved panel sizes of predetermined dimensions. For this purpose, a first set of proximity sensors (not shown) may be used for selecting predetermined distances by which the movable section 38 may be spaced from the remaining fixed cradles, including end cradle 20, for example. A second set of proximity sensors, shown at 60, may be utilized for assuring appropriate contact of the curved panel 70, as a raw panel workpiece to be machined, against the upper cradle surfaces 26.

Figure 3:
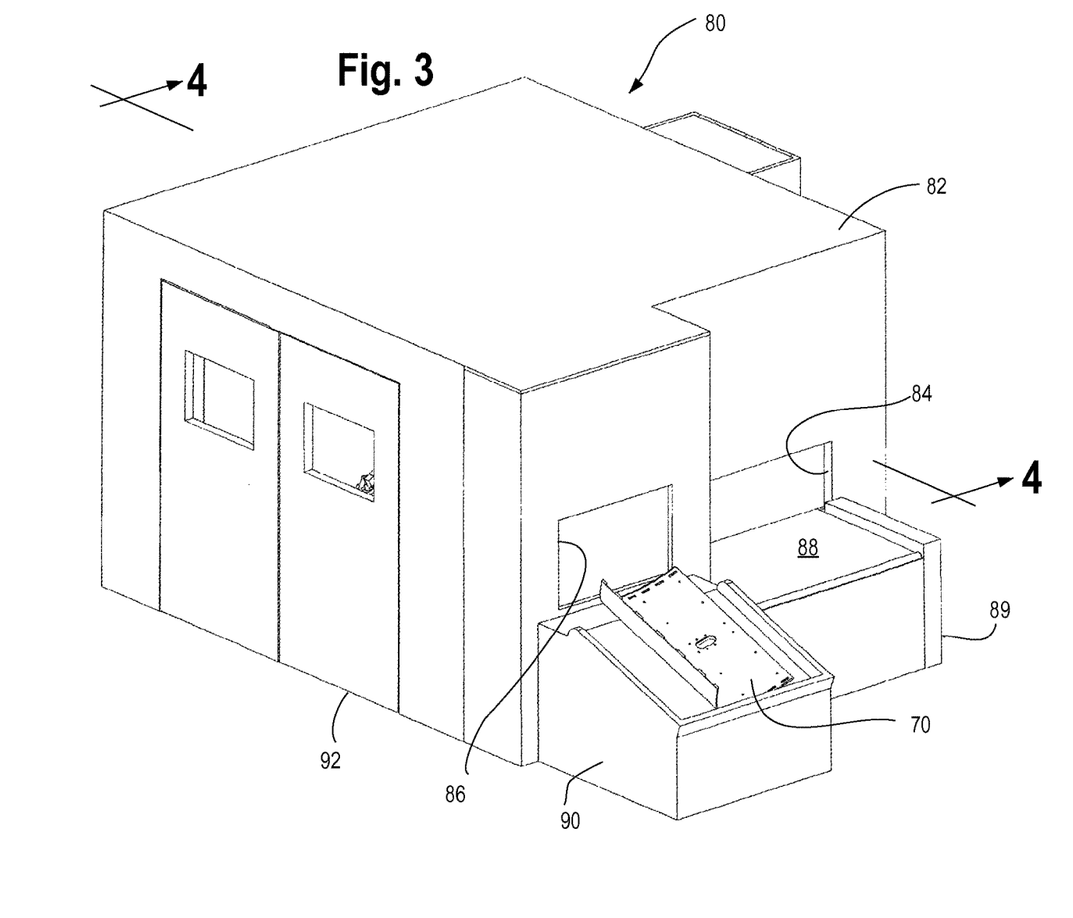
FIG. 3 is a schematic perspective view of a modular machining router cell utilized for containing and operating the fixturing device of FIG. 1.

Referring now to FIG. 3, a system 80 for using the active fixturing device 10 may now be described. The system includes an enclosure cell 82 which includes a sealable loading entrance 84. The system 80 also includes a first sealable exit 86, a first holding table 88, and a second holding table 90. Cell entry doors 92 provide ingress and egress to and from the enclosure cell 82 for maintenance and/or servicing of equipment contained within the enclosure cell.

Figure 4:
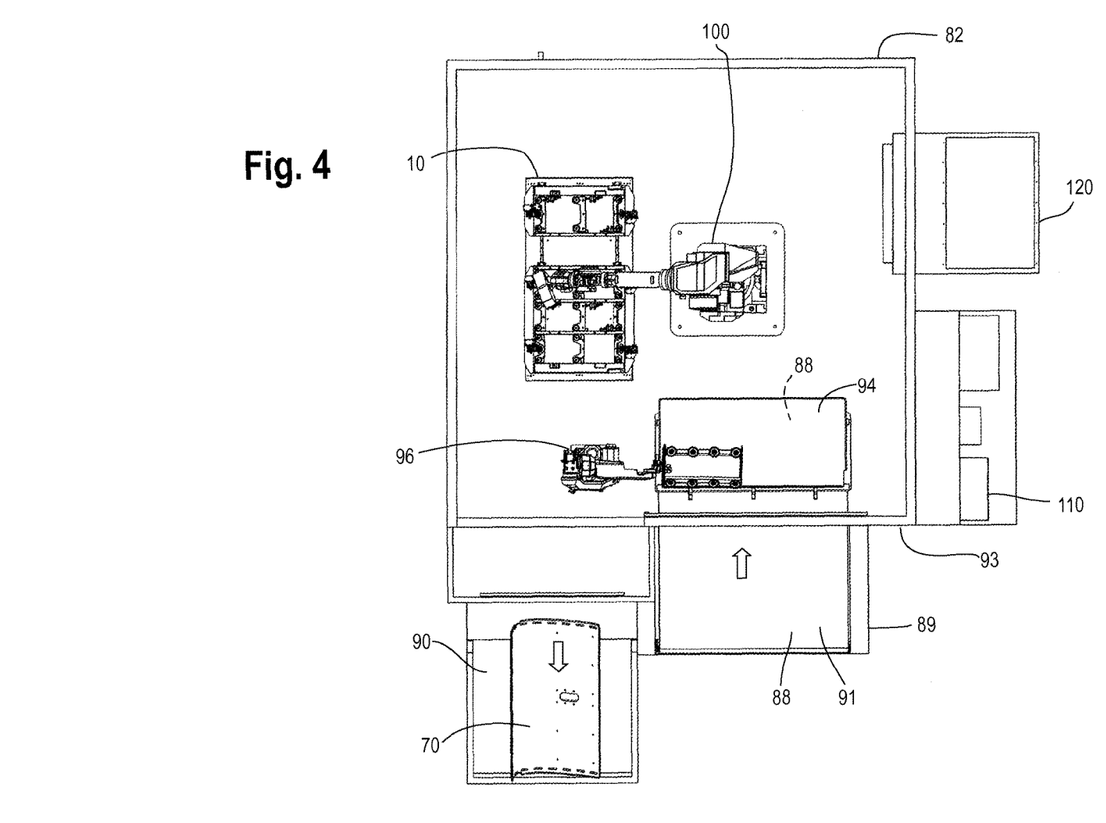
FIG. 4 is a schematic plan view of the router cell of FIG. 4, revealing an exemplary machine fixture router system of the present disclosure.

Referring now also to FIG. 4, a plan view of the enclosure cell 82 reveals the fixturing device 10 along with a first robot 96, which may be called a handling robot. The robot 96 is configured to obtain unfinished workpieces, i.e. curved panels 70, from the first holding table 88 and to transport them ultimately to the fixturing device 10. The first holding table 88 is configured to roll along a shuttle base 89, between a first position 91 outside of the enclosure cell 82, through a sealable loading entrance 84, and into a second position 94, within the enclosure cell 82. The table shuttle base 89 extends through a wall 93 as shown, for accommodating transport movement of the table 88 from an exterior to an adjacent interior of the enclosure cell 82. From the second position 94 of the table 88, the robot 96 may remove unfinished or raw panel workpieces 70 and transport them directly to the fixturing device 10. A second robot 100, which may be referred to as a routing robot, can be utilized to actually perform machining processes on the edges 72 (FIG. 2) of the curved panels 70, for example.

A controller 110 may be employed to coordinate and manage movements of the robots 96, 100 for transport, processing, and general manipulation, of the workpieces 70 from the first holding table, to the fixturing device 10, and ultimately from the fixturing device 10, through the sealable exit 86 (FIG. 3) and onto the second holding table 90. In the described embodiment, the second holding table 90 may be configured to tilt downwardly as shown, in order to function as a type of slide (if or as desired) for finished workpieces; i.e. the curved panels 70.

Finally, a dustbin 120 may be employed for evacuation of machine processing debris accumulated during machining of the curved panels 70. The dustbin 120 may include a filter system, including a fan and motor for driving the fan (none shown). As such, the controller 110 may be configured to control the motor for driving the fan. The cell entry doors 92 (FIG. 3) may be used to periodically access the dustbin, and/or to service the robots 96, 100 and fixturing device 10, as required.

Figure 5:
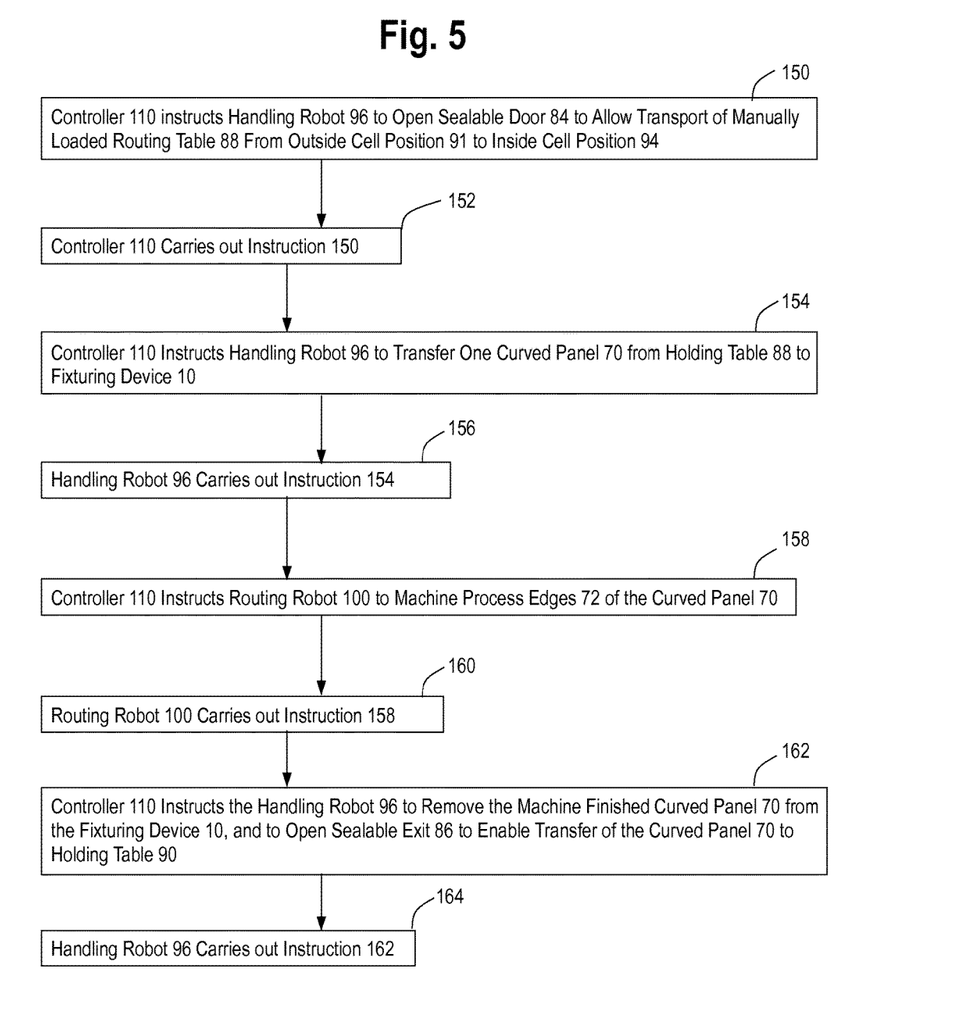
FIG. 5 is a flowchart depicting exemplary functions of the fixture router system schematically shown in FIGS. 3 and 4.

Operation of the system 80 may now be described in reference to the flowchart of FIG. 5, which depicts only one limited exemplary method of managing several operational interactions by the controller 110.

Method

A detailed method of using the system 80 may involve the following:

An unfinished workpiece, i.e. raw curved panels 70, is first manually loaded onto the holding table 88 by an operator, while the table 88 is in position 91; i.e. outside of the enclosure cell 82. The operator then selects an appropriate routing program for a desired part number. The automated controller 110 is configured to next execute a series of built-in safety checks. The automated controller 110 prompts an opening of the sealable entrance loading 84, wherein the holding table 88 shuttles on rails (not shown) through the 84 from its exterior position 91 to the position 94 within the enclosure cell. Once the holding table 88 is inside, the controller 110 prompts the closing of the sealable entrance 84. The controller 110 then instructs the handling robot 96 to transfer the curved panel 70 from the holding table 88, and onto the fixturing device 10. The robot 96 is moved to a safe position away from the fixturing device 10, and the sealable entrance 84 reopens for the shuttle table 88 to move back to its original start position 91.

Upon closure of the sealable entrance 84, the controller 110 next runs through a sequence of safety checks, and activates the vacuum clamping system 12 (FIG. 1). The controller 110 instructs the routing robot 100 to machine the edges 72 of the curved panel 70 and cut slots 71, and the routing robot 100 sequentially carries out the instructions, and moves to a safe location. The controller 110 next instructs the handling robot 96 to blow compressed air over the machine-finished curved panel 70 to remove residual dust and debris from processing of the finished curved panel 70, and to then remove the curved panel 70 from the fixturing device 10. The controller 110 next instructs the opening of the sealable exit 86, and the transfer of the machine-finished curved panel 70 to the holding table 90, and the handling robot 96 then carries out the instruction. The handling robot 96 then moves away from the holding table 90, and the sealable exit 86 closes. For continued sequencing of the routing process, the operator places the next panel to be routed on the table 88, and selects an appropriate routing program.

Automated repetitive sequences disclosed herein may further include having the controller 110 manage any simultaneous and/or sequential actuations and shut-offs of the respective pneumatic suction cups 30 and 40 on the fixturing device 10 for appropriate pre-machining placement and subsequent holding of a curved panel 70 in place during machining. Finally, the controller 110 may also be used to program operation of the dustbin fan motor, for example, whenever the robot 110 is operating. Other benefits will be appreciated by those skilled in the art.

INDUSTRIAL APPLICABILITY

The disclosed system 80, configured for transporting, routing and/or machine processing a semi-rigid curved panel 70, may offer improved and automated machining capabilities for large numbers of semi-rigid workpieces/panels 70 of varying sizes. The disclosed system 80 may alleviate handling and/or routing issues of parts that may be particularly prone to warping, and/or having tendencies of being twisted out of intended or desired configurations, contributing to high scrap rates. The disclosed fixturing device 10 may accommodate a wide variety of parts and structures even beyond those described and contemplated in this disclosure. As such, the system 80, particularly through automation via the controller 110, may provide improved part surface finishes, shorter machining cycles, as well as reduced workplace environmental hazards associated with prior art methods.

Additional benefits of the system 80 may include a) the vacuum clamping system 12 having retractable and rotatably movable suction cups 30, 40 for achieving consistent and repeatable nesting of the raw curved panels, with the suction cups being moveable away from tool surfaces of the fixture for accurate routing; b) an "active" fixturing control mechanism that is configured to repetitiously and consistently position semi-rigid panels for optimal routing; and c) a fixturing device managed by a controller 110 to automate handling and routing of awkward semi-rigid curved panels.

Although only single embodiments of the described fixture and enclosure cell structures have been particularly described herein, it should be appreciated that the disclosure is not intended to be limiting but, for purposes of economy and convenience, to be only exemplary.

What is claimed is:

1. A fixturing device for processing a semi-rigid panel comprising:
   a base extending longitudinally along an axis;
   a plurality of contoured support members, situated perpendicularly to the axis, and laterally secured to the base;
   at least one of the contoured support members being axially movable on the base, and configured for being selectively fixable to the base in one of a plurality of positions;
   the plurality of contoured support members including a first end contoured support member and a second end contoured support member, the first and second end contoured support members defining longitudinal extremities of the fixturing device;
   a first pneumatically controlled suction device orthogonally retractable with respect to the axis;
   a second pneumatically controlled suction device rotatably movable relative to the contoured support members;
   a first proximity sensor attached to one of the contoured support members for sensing whether the at least one of the contoured support members is securely fixable in one of a plurality of selective axially spaced positions on the base;
   a second proximity sensor secured to one of the contoured support members for determining whether the semi-rigid panel is in contact with the at least one of the contoured support members; and
   wherein the base comprises a rail, and wherein one of the first and second end contoured support members and an adjacent contoured support member are movably supported on the rail along the axis for adjusting the fixturing device to accommodate different sized semi-rigid panels.

2. The fixturing device of claim 1, wherein the contoured support members comprise cradles configured to support the semi-rigid panel.

3. The fixturing device of claim 1, wherein the first pneumatically controlled suction device is configured to hold a semi-rigid panel in a fixed position relative to the base.

4. The fixturing device of claim 1, wherein the second pneumatically controlled suction device is configured to initially pull a semi-rigid panel into a fixed placement, and, in concert with the first pneumatically controlled suction device, to hold the semi-rigid panel in a fixed position on the contoured support members relative to the base during a machining process.

5. The fixturing device of claim 4, wherein the first proximity sensor is configured to sense a position along the axis prior to the fixed placement of the semi-rigid panel on the contoured support members.

6. The fixturing device of claim 1, wherein the second proximity sensor is configured to sense physical contact of a workpiece with at least one of the cradles.

7. The fixturing device of claim 1, wherein the first pneumatically controlled suction device is a suction cup.

8. The fixturing device of claim 1, wherein the second pneumatically controlled suction device comprises a suction cup.

9. The fixturing device of claim 1, wherein the second pneumatically controlled suction device is a smaller suction cup than that of the first pneumatically controlled suction device.

10. The fixturing device of claim 1, comprising pluralities of first and second pneumatically controlled suction devices, each being relatively movable with respect to at least one cradle.

11. The fixturing device of claim 1, wherein the pluralities of first and second pneumatically controlled suction devices comprise a vacuum clamping system.

* * * * *